(12) United States Patent
Liu

(10) Patent No.: US 7,006,169 B2
(45) Date of Patent: Feb. 28, 2006

(54) DISPLAY FRAME STRUCTURE MOUNTING ARRANGEMENT

(75) Inventor: Tsyr-Huey Liu, Taipei (TW)

(73) Assignee: Tatung Co., Ltd., Taipei (TW)

( * ) Notice: Subject to any disclaimer, the term of this patent is extended or adjusted under 35 U.S.C. 154(b) by 129 days.

(21) Appl. No.: 10/800,620

(22) Filed: Mar. 16, 2004

(65) Prior Publication Data

US 2005/0134758 A1  Jun. 23, 2005

(30) Foreign Application Priority Data

Dec. 17, 2003  (TW) .............................. 92222115 U

(51) Int. Cl.
*G02F 1/1333*   (2006.01)

(52) U.S. Cl. ......................................... 349/58; 349/60

(58) Field of Classification Search ................. 349/58, 349/60
See application file for complete search history.

(56) References Cited

U.S. PATENT DOCUMENTS 5,680,183 A * 10/1997 Sasuga et al. ................ 349/58
6,466,282 B1 * 10/2002 Sasuga et al. ................ 349/58

\* cited by examiner

*Primary Examiner*—Dung T. Nguyen
*Assistant Examiner*—David Y. Chung
(74) *Attorney, Agent, or Firm*—Bacon & Thomas, PLLC

(57) ABSTRACT

A display frame structure mounting arrangement includes a base frame accommodating a display panel and a front cover fastened to the base frame to hold the display panel in position, the front cover having a plurality of locating devices each having at least two upright arms protruded from the back surface of the front cover and a transverse block joining the upright arms and spaced from the back surface of the front cover by a gap, the base frame having a top flange stopped below the transverse block of each locating device, a plurality of top lugs respectively engaged into the gap between the back surface of the front cover and the transverse block of each locating device, and a plurality of bottom mounting devices fastened to the respective bottom mounting devices of the front cover by screws.

3 Claims, 4 Drawing Sheets

DISPLAY FRAME STRUCTURE MOUNTING ARRANGEMENT

BACKGROUND OF THE INVENTION

1. Field of the Invention

The present invention relates to a display frame structure and, more particularly, to the mounting arrangement of the base frame and the front cover of a display frame structure for LCD.

2. Description of Related Art

Following fast development of information technology, compact LCDs (Liquid Crystal Displays) have been intensively used in computer to substitute for conventional bulky CRT (Cathode Ray Tube) monitors.

A regular LCD comprises a display panel mounted in between a base frame and a front cover, i.e., the display panel is mounted in the base frame and then the base frame is affixed to the front cover, keeping the display screen facing the front cover. According to conventional designs, a large number of screws are used to fasten the base frame to the front cover. Because the display panel is not directly affixed to the front cover, a gap may exist between the front cover and the display panel, and outside dust or water may pass through the gap to the inside of the display, thereby damaging the internal parts of the display. Further, using screws to affix the base frame to the front cover requires much labor and installation time, resulting in high manufacturing cost.

Therefore, it is desirable to provide a display frame structure mounting arrangement that eliminates the aforesaid drawbacks.

SUMMARY OF THE INVENTION

The present invention has been accomplished under the circumstances in view. It is the main object of the present invention to provide a display frame structure mounting arrangement, which reduces the gap between the display panel and the front cover, prohibiting entrance of any external bodies or fluid. It is another object of the present invention to provide a display frame structure mounting arrangement, which requires less labor and installation time, reducing the installation cost and improving the installation efficiency.

To achieve these and other objects of the present invention, the display frame structure mounting arrangement comprises a front cover, a base frame, and a display panel. The front cover is shaped like an open frame, having a front surface, a back surface, a top frame bar, a bottom frame bar, a left-side frame bar, a right-side frame bar, a display space surrounded by the top frame bar, the bottom frame bar, the left-side frame bar and the right-side frame bar, and a plurality of mounting devices respectively disposed at the bottom frame bar in the back surface. The base frame is shaped like a flat pan, comprising a top flange, a bottom flange, a left-side flange, a right-side flange, a receiving chamber surrounded by the top flange, the bottom flange, the left-side flange and the right-side flange, and a plurality of mounting devices disposed at the bottom flange respectively corresponding to the mounting devices of the front cover. The display panel is mounted in the receiving chamber of the base frame corresponding to the display space of the front cover. The front cover comprises a plurality of locating devices respectively disposed at the top frame bar in the back surface of the front cover. Each locating device comprises at least two upright arms respectively protruded from the back surface of the top frame bar of the front cover and mutually spaced with each other a predetermined distance, and a transverse block connected to the at least two upright arms. The transverse block has a front side spaced from the back surface of the front cover by a gap, and a bottom side forming a stop face. The base frame comprises a plurality of lugs respectively upwardly extended from the front edge of the top flange. During installation, the lugs of the base frame are respectively engaged into the gap between the back surface of the front cover and the front side of the transverse block of each locating device of the front cover and stopped at the front side of the transverse block of each locating device, keeping the outer side of the top flange of the base frame stopped against the stop face of the transverse block of each locating device of the front cover, and then the mounting devices of the base frame are respectively fastened to the corresponding mounting devices of the front cover.

When lifted the base frame to stop the top flange against the stop face of the transverse block of each locating device of the front cover, the effect of the arm of force of the upright arms of the locating devices effectively reduces the gap between the front cover and the display panel to prevent entering of external bodies or fluid into the inside of the display frame structure. And by the designs of the locating devices of the front cover and the lugs of the base frame, the display frame structure mounting arrangement of the present invention effectively saves installation labor and time, reducing installation cost and improving installation efficiency.

DETAILED DESCRIPTION OF THE PREFERRED EMBODIMENT

Figure 1:
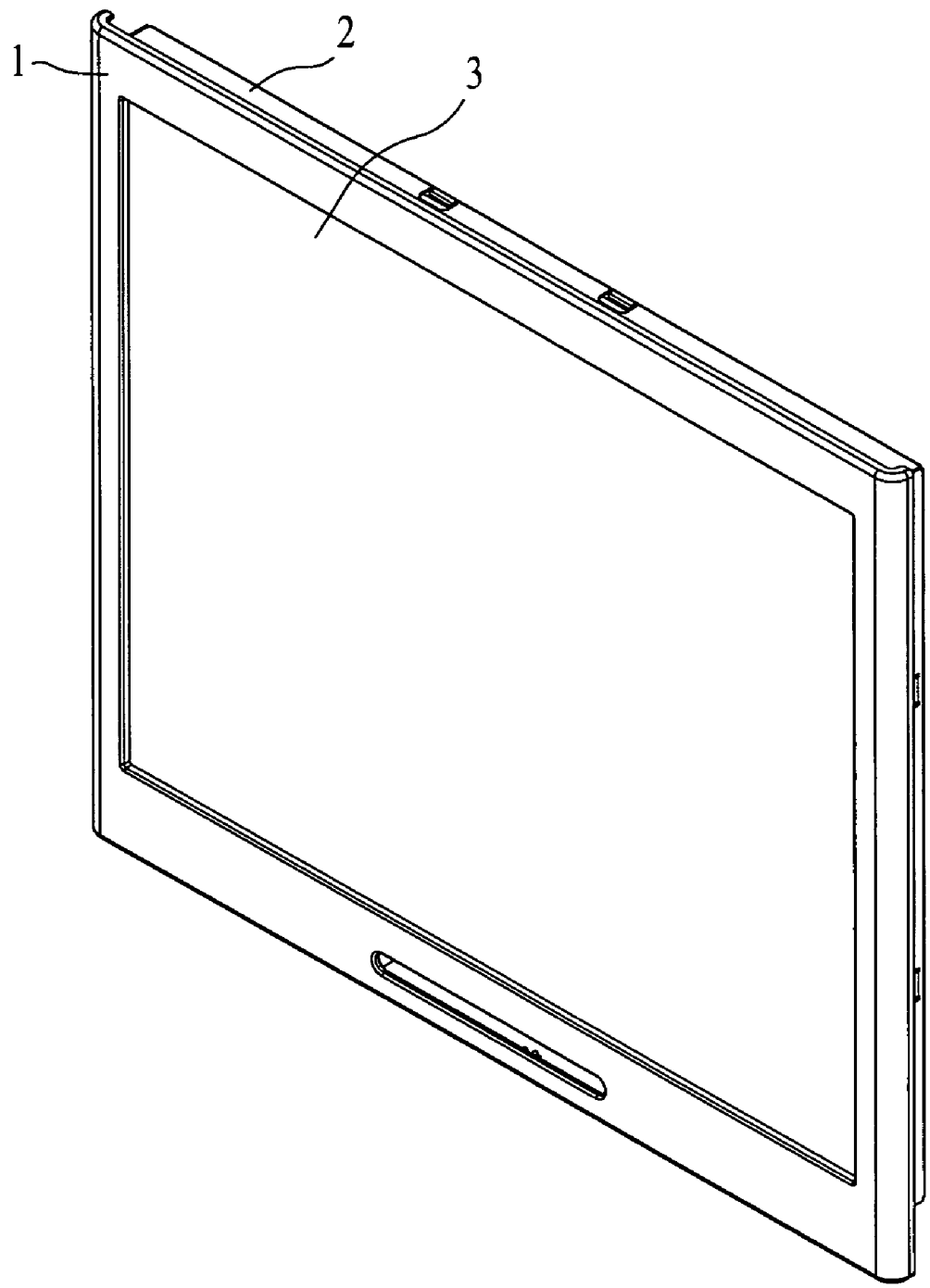
FIG. 1 is a perspective assembly view of a display frame structure mounting arrangement according to the present invention.

Referring to FIG. 1, a display frame structure mounting arrangement is shown comprised of a front cover 1, a base frame 2, and a display panel 3.

Figure 2:
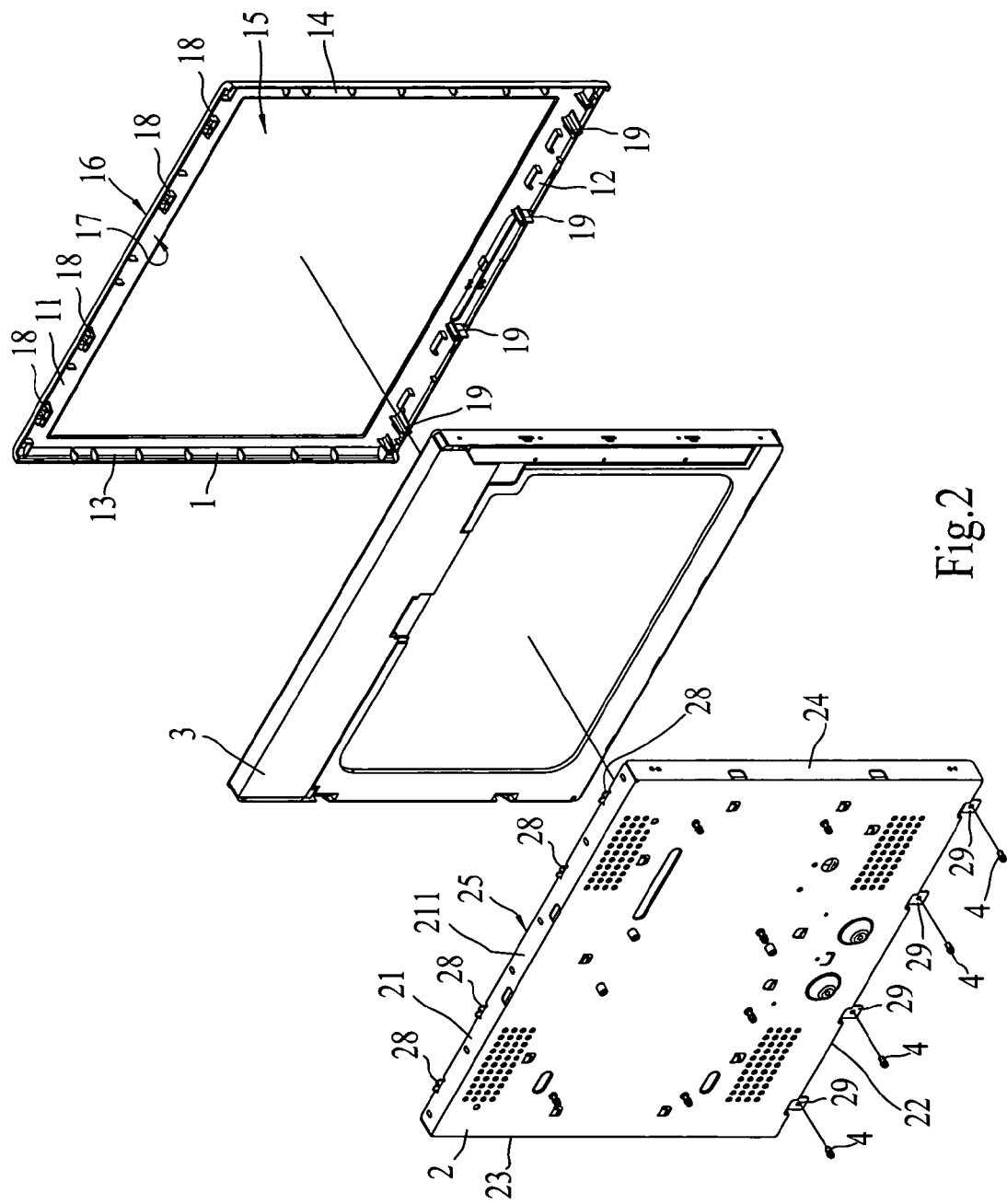
FIG. 2 is an exploded view of the display frame structure mounting arrangement according to the present invention.
Figure 3:
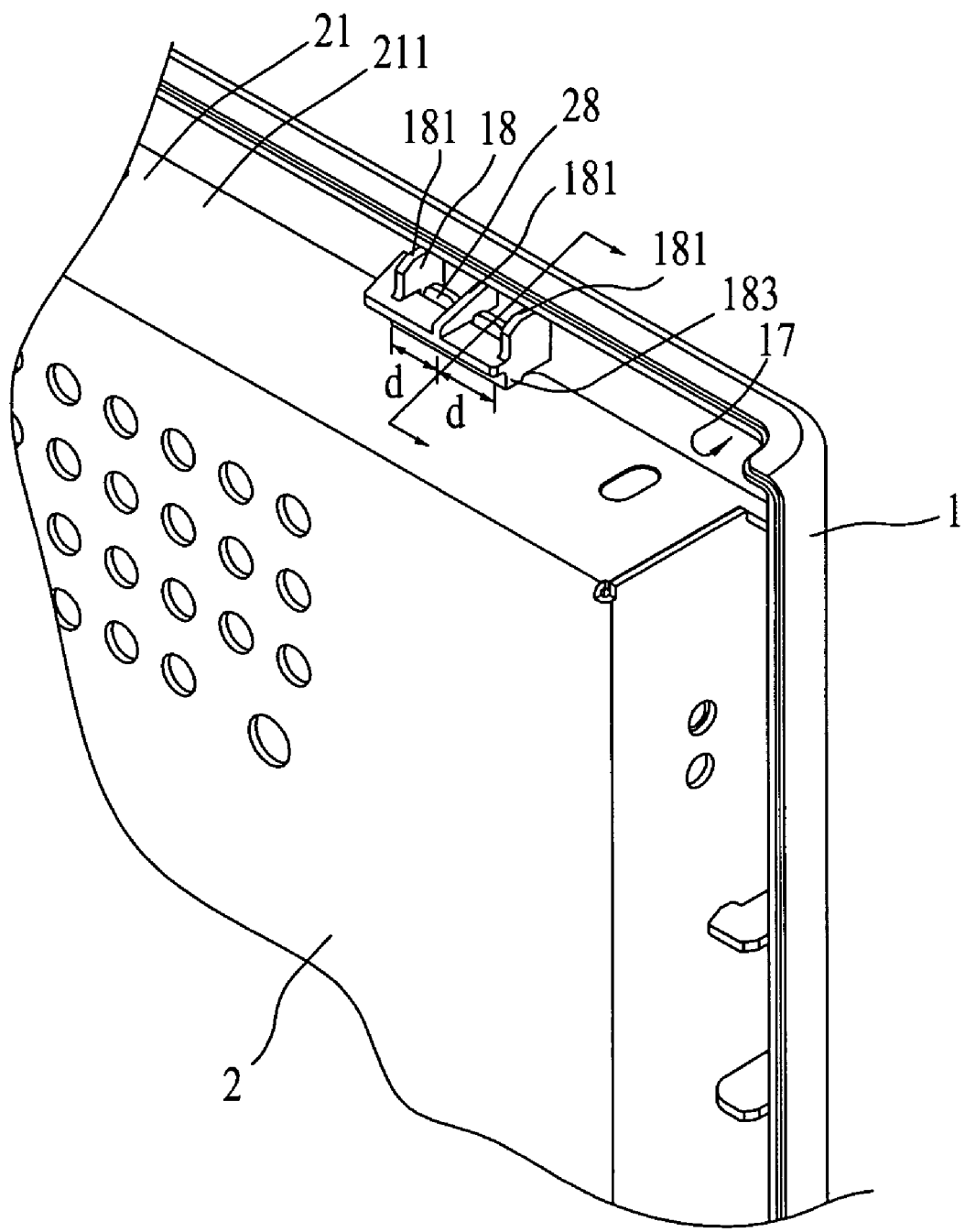
FIG. 3 is an enlarged view of a part of the display frame structure mounting arrangement according to the present invention.
Figure 4:
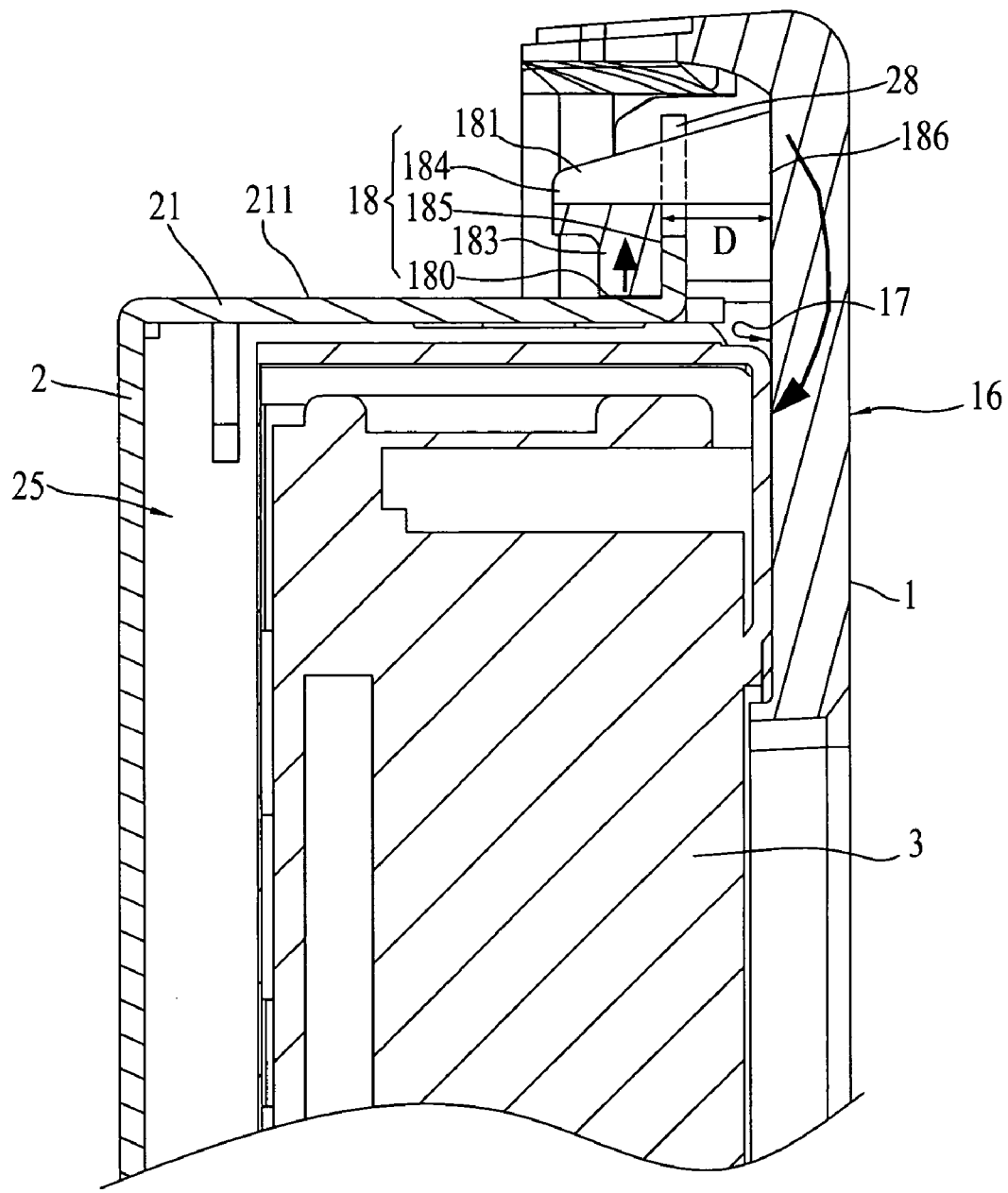
FIG. 4 is a sectional view of FIG. 3.

Referring to FIGS. 2~4 and FIG. 1 again, the front cover 1 is an open frame member comprising a top frame bar 11, a bottom frame bar 12, a left-side frame bar 13, and a right-side frame bar 14. The frame bars 11~14 define a display space 15. The front cover 1 has a front surface 16 and a back surface 17. The front cover 1 further comprises four mounting devices 19 provided at the bottom frame bar 12 in the back surface 17. According to this embodiment, the mounting devices 19 are bosses.

The base frame 2 is shaped like a flat pan comprising a top flange 21, a bottom flange 22, a left-side flange 23, a right-side flange 24, a receiving chamber 25 surrounded by the flanges 21~24, and four mounting devices 29 provided at the bottom flange 22 respectively corresponding to the mounting devices 19 of the front cover 1. According to the present preferred embodiment, the mounting devices 19 of the front cover 1 are mounting through holes.

The display panel 3 according to the present preferred embodiment is a LCD panel mounted in the receiving chamber 25 of the base frame 2 corresponding to the display space 15 of the front cover 1.

The front cover 1 further comprises four locating devices 18 provided at the top frame bar 11 and suspended in the back surface 17 of the front cover 1. Each locating device 18 comprises three upright arms 181 respectively protruded from the back surface 17 and arranged in parallel and mutually spaced with each other a predetermined distance d, and a transverse block 183 connected the upright arms 181. Each upright arm 181 has a front end 186 fixedly connected to the top frame bar 11 and backwardly protruded from the back surface 17 of the front cover 1, a rear end 184 connected to the transverse block 183. The transverse block 183 has a front side 185 spaced from the back surface 17 of the front cover 1 by a gap D, and a bottom side forming a stop face 180. The base frame 2 further comprises a plurality of lugs 28 upwardly extended from the front edge of the top flange 21.

During installation, the display panel 3 is mounted in the receiving chamber 25 of the base frame 2 corresponding to the display space 15 of the front cover 1, and then the base frame 2 is attached to the back surface 17 of the front cover 1 to insert the lugs 28 of the top flange 21 of the base frame 2 into the gap D between the back surface 17 of the front cover 1 and the front side 185 of the transverse block 183 of the locating devices 18, keeping the lugs 28 stopped at the front side 185 of the transverse block 183 of each locating device 18 and the outer side 211 of the top flange 21 of the base frame 2 stopped against the stop face 180 of the transverse block 183 of each locating device 18, and then four screws 4 are respectively inserted into the through holes 29 of the base frame 2 and threaded into the bosses 19 of the front cover 1 to affix the base frame 2 to the front cover 1, completing the installation process.

Referring to FIGS. 3 and 4 again, when lifted the base frame 2 to stop the outer side 211 of the top flange 21 of the base frame 2 against the stop face 180 of the transverse block 183 of each locating device 18 of the front cover 1, the effect of the arm of force of every upright arm 181 of every locating device 18 causes the front cover 1 to produce an inwardly inclined prestressing (see the arrow sign in FIG. 4), i.e., the effect of the arm of force of the upright arms 181 of the locating devices 18 effectively reduces the gap between the front cover 1 and the display panel 3 to prevent entering of external bodies or fluid into the inside of the display frame structure. Further, the engagement between the lugs 28 and the locating devices 18 eliminates the problem of the conventional design due to the use of a large number of screws, i.e., the display frame structure mounting arrangement of the present invention effectively saves much installation labor and time, reducing the installation cost, and improving installation efficiency.

Although a particular embodiment of the present invention has been described in detail for purposes of illustration, various modifications and enhancements may be made without departing from the spirit and scope of the invention. Accordingly, the invention is not to be limited except as by the appended claims.

What is claimed is:

1. A display frame structure mounting arrangement comprising:

a front cover shaped like an open frame, said front cover having a front surface, a back surface, a top frame bar, a bottom frame bar, a left-side frame bar, a right-side frame bar, a display space surrounded by said top frame bar, said bottom frame bar, said left-side frame bar and said right-side frame bar, and a plurality of mounting devices respectively disposed at said bottom frame bar in said back surface;

a base frame shaped like a flat pan, said base frame comprising a top flange, a bottom flange, a left-side flange, a right-side flange, a receiving chamber surrounded by said top flange, said bottom flange, said left-side flange and said right-side flange, and a plurality of mounting devices disposed at said bottom flange respectively corresponding to the mounting devices of said front cover; and a display panel mounted in said receiving chamber of said base frame corresponding to the display space of said front cover;

wherein, said front cover comprises a plurality of locating devices respectively disposed at said top frame bar in the back surface of said front cover, said locating devices each comprising at least two upright arms respectively protruded from the back surface of the top frame bar of said front cover and mutually spaced with each other a predetermined distance, and a transverse block connected to said at least two upright arms, said transverse block having a front side spaced from the back surface of said front cover by a gap and a bottom side forming a stop face;

wherein, said base frame comprises a plurality of lugs respectively upwardly extended from a front edge of said top flange and respectively engaged into the gap between the back surface of said front cover and the front side of the transverse block of each said locating device and stopped at the front side of the transverse block of each said locating device, the top flange of said base frame having a outer side stopped against the stop face of the transverse block of each said locating device; the mounting devices of said base frame are respectively fastened to the corresponding mounting devices of said front cover.

2. The display frame structure mounting arrangement as claimed in claim 1, wherein the mounting devices of said front cover are bosses, and the mounting devices of said base frame are mounting through holes respectively fastened to the bosses of the mounting devices of said front cover by respective screws to secure said base frame to said front cover.

3. The display frame structure mounting arrangement as claimed in claim 1, wherein said display panel is a LCD (liquid crystal display) panel.

* * * * *